BEST AVAILABLE COPY

W. Hunt.

Pantaloon Strap.

No. 16.

Reissued Nov. 16. 1839.

UNITED STATES PATENT OFFICE.

WALTER HUNT, OF NEW YORK, N. Y., ASSIGNOR TO OSBORNE M. MACDANIEL.

IMPROVEMENT IN THE MODE OF MAKING SPIRAL SPRINGS FOR BELTS, PANTALOONS, VESTS, &c.

Specification forming part of Letters Patent No. 649, dated March 21, 1838; Reissue No. 16, dated November 16, 1839.

*To all whom it may concern:*

Be it known that I, WALTER HUNT, of the city, county, and State of New York, have invented a new and useful mode of arranging and adapting flat spiral springs to various articles, such as straps, belts, suspenders, &c., also an improvement in the forming of hooks or tongues upon the ends of said springs, designed for the above-mentioned purposes; and I do hereby declare that the following is a full and accurate description thereof.

Figure 1:
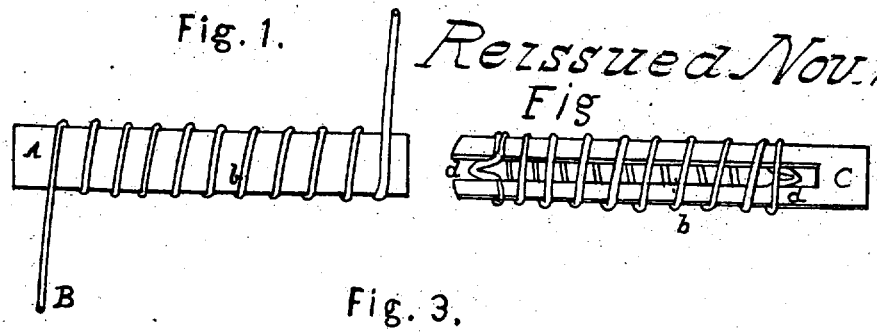

In forming springs for the above-mentioned purposes I use about from No. 16 to No. 24 wire, (for wide straps the larger and for narrow the smaller sizes,) which is wound around a flat steel arbor or mandrel, (see Fig. 1, letter A,) made to turn in a lathe or otherwise.

Figure 3:
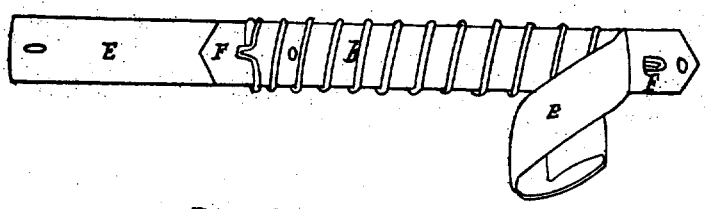

When the springs are designed for hooks or tongues upon the end or ends, I leave a sufficient length of wire to form the same, as shown, upon said arbor at B B upon the spring *b*, which hooks I form with pliers or otherwise, coiling the remaining end or ends upon a flat steel bar or mandrel, as shown at Fig. 2, letter C, with a slot running through the center of the same, which allows the hooks or tongues at *d d* to be bent partially inward, in order the better to enter the eyelet-holes of the straps to which they are adapted. This improved formation of the spring is adapted to leather and metal straps, belts, webbing, &c., as shown in Fig. 3, where the straps E E pass each other through the center of the coiled spring *b* and receive the tongues at F F in the eyelet-holes before mentioned, in which arrangement the spring answers the double purpose of spring and buckle.

When the spring is to be incased or covered, I dispense with one or both of the tongues, (as being formed upon the springs,) and instead thereof one end of the spring is secured to the case or cover by stitching or otherwise. In this arrangement of the spring I insert but one strap through the coil, the inserted end of which may be doubled over and stitched or otherwise arranged so that the strap cannot be drawn through the spring. (See Fig. 4.) The center strap, G, passes through the spring L, which is inclosed in the case H (exhibited partially open) and secured within the same at K K.

Figure 4:
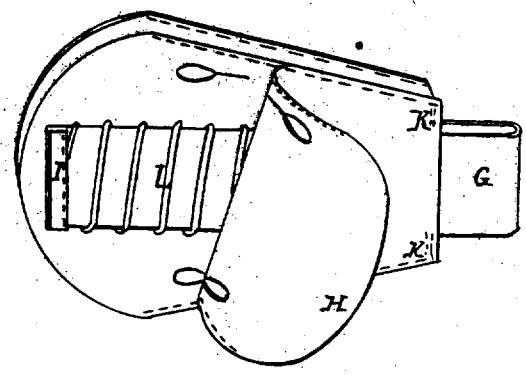
Figure 5:
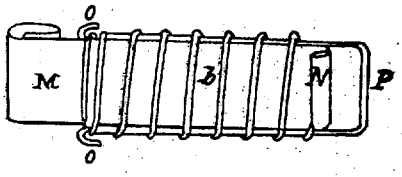

When the springs are adapted to sheet-metal or wire appendages, the hooks or other arrangements of bearing may be formed upon the latter, as shown in Fig. 5, the wire P passing through the spring *b* at the corners or sides and hooked over at O O, while the metal strap M passes between the wires, the end of which is folded or enlarged at N to prevent its being drawn through the spring, as before mentioned, which last-mentioned arrangements may be used conjointly or separately and inclosed in a case or sheath, as in H, Fig. 4, or otherwise.

This improvement is applicable to pantaloons-straps to secure them under the boot or shoe, to suspenders, to belts, the backs of vests, and various other useful purposes.

I do not claim the spring nor its form as above described, nor the tongue, hook, or projection as above described, nor any other part of the above-described improvement separate and independently of the combination and arrangement herein set forth and claimed, nor any combination of the parts of the above improvement other than what I have here specially set forth and claimed; but I do claim as my invention and improvement—

1. The combination of a flat spiral spring with a projection, hook, or tongue, as above set forth, and for the purposes aforesaid.

2. In combination with straps of leather or metal or web, fastened as above set forth, and also in combination with the fastening of the spring at the bottom of its case or covering and the fastening of the web or strap to the top of the spring, as above set forth, when the hook, tongue, or projection is not used, so as to secure the action of a flat spiral spring by extension, for the purposes and in the manner above described.

New York, September 14, 1839.

WALTER HUNT.

Witnesses:

D. E. WHEELER,

W. C. WHITTELSEY.